MULTIPLEX COMMUNICATION SYSTEM CROSSTALK SUPPRESSION

Filed March 10, 1958

INVENTOR.
THEODOR FRANKEL
BY F. W. Henson
ATTORNEY 3,071,651
Patented Jan. 1, 1963

3,071,651

MULTIPLEX COMMUNICATION SYSTEM CROSSTALK SUPPRESSION

Theodor Frankel, Rochester, N.Y., assignor to General Dynamics Corporation, Rochester, N.Y., a corporation of Delaware Filed Mar. 10, 1958, Ser. No. 720,186
5 Claims. (Cl. 179—15)

This invention relates in general to multiplex communication systems and, more particularly, to the suppression of crosstalk between the channels of multiplex communication systems.

Crosstalk between channels constitutes a major problem in any time division multiplex system. Signal hangover from one channel into the next, commonly termed crosstalk, is chiefly caused by energy stored in the distributed capacitance of the transmission line which interconnects the speech or communication channels of the system. One commonly employed method for reducing the crosstalk between channels is to increase the guard time between multiplex pulses applied to the transmission line to the point where the energy stored in the distributed capacitance of the transmission line by each multiplex pulse can be discharged through the high back resistance of the devices which connect the various channels to the transmission line before the next multiplex pulse is applied to the transmission line. This method, of course, severely limits the number of speech or communication channels that can be multiplexed over a single transmission line.

Accordingly, it is the general object of this invention to provide a new and improved multiplex communication system.

It is a more particular object of this invention to increase the number of channels served by a single transmission line and to eliminate crosstalk between channels of a multiplex communication system.

The present invention accomplishes the above cited objects by providing means for discharging energy stored in the distributed capacitance of a multiplexed transmission line through a very low impedance at the termination of each multiplex pulse. In the illustrated embodiment of the invention, the time position defining pulses, which are utilized to gate the channels to the transmission line on a one at a time basis, are differentiated to produce control pulses corresponding to the trailing edge of said time position defining pulses and the control pulses are utilized to render a semi-conductor switch conductive to discharge the energy stored in the distributed capacitance of the transmission line.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawing which comprises three figures on a single sheet.

Figure 1:
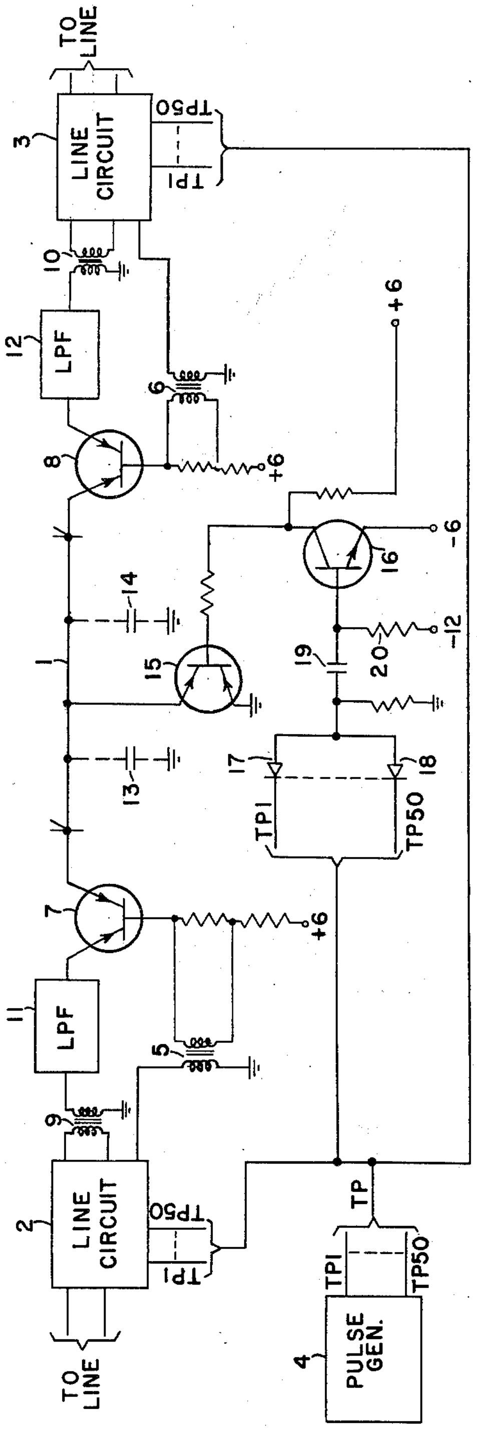
FIG. 1 shows a multiplex communication system of the unbalanced line type.

The invention has been illustrated as embodied in a telephone system of the same general type as the one disclosed in copending application, Serial No. 721,241, filed March 13, 1958, and assigned to the same assignee as the present invention. As fully described in the above-identified application, an idle time division channel on highway or transmission line 1 is assigned to each calling line circuit by a channel allotter, and the same time position is later assigned to the called line circuit by an incoming register provided in the system. Also as fully described in the above-identified application, each line circuit comprises a storage circuit for storing the identity of the assigned time position and for controlling the application of the particular corresponding time position defining pulse, which is generated by a common pulse generator provided in the system, to the voice switch which connects that line circuit to the transmission line. Only the portion of the system necessary for an understanding of the present invention has been shown in FIG. 1.

To illustrate the general operation of the system, assume that line circuit 2 is the calling line circuit and that line circuit 3 is the called line circuit on a particular call and that time position 1 on transmission line 1 has been assigned to that call. Under these conditions, the negative-going pulse generated in time position 1 in each time position frame by pulse generator 4 and coupled over conductor TP1 to all of the line circuits of the system is gated through the time position identification storage circuits (not shown) in line circuits 2 and 3 to the primary windings of pulse transformers 5 and 6, respectively, to control the voice gate switches between line circuits 2 and 3 and transmission line 1.

The voice gate switches have been illustrated as comprising symmetrical or bilateral transistors, such as transistors 7 and 8, and thus have an arrow superimposed on both of their so-called emitter and collector electrodes. Since these transistors function in a bilateral manner to pass either positive or negative signals in either direction, it is desirable that they exhibit good amplification with either junction acting as the emitter and the opposite junction acting as a collector. Most transistors have this characteristic to a sufficient extent, although better results can be achieved with transistors specially designed to have good forward and reverse characteristics. For a more detailed explanation of the operation of bilateral transistors, reference is made to United States Patent No. 2,816,238, which is assigned to the same assignee as the present invention.

The voice gate bilateral transistors, such as 7 and 8, which gate each line circuit to the transmission line, are normally biased for non-conduction since their base electrodes are returned to a suitable positive potential, illustrated as plus six volts, and are thus positive with respect to their emitter-collector electrodes. In the assumed call, a pulse in time position 1 appears across the secondary windings of pulse transformers 5 and 6 and the pulse transformer windings are so poled that the base electrodes of transistors 7 and 8 are driven negative with respect to their emitter-collector electrodes and transistors 7 and 8 are rendered conductive. Speech signals coupled through speech transformers 9 and 10 are coupled through conducting transistors 7 and 8 to transmission line 1. Low-pass filters 11 and 12 are provided in the voice path to demodulate the signal samples coupled through transistors 7 and 8, respectively, and these filters may include a capacitor connected between the speech path and ground and an inductor connected in series with the speech path. The aforementioned capacitor and inductor serve to eliminate the attenuation of the speech signals caused by the process of time sharing. Although only one signaling or speech channel, namely, the one between calling and called line circuits 2 and 3, respectively, has been shown, it is to be understood that fifty or more signaling or speech channels can be served by the illustrated system. Further, if twenty percent trunking is satisfactory for a particular application, two thousand five hundred line circuits identical to line circuits 2 and 3 can be served by transmission line 1. It should now be obvious that transmission line 1 carries fifty or more time interlaced trains of pulses of which adjacent pulses are modulated in accordance with speech signals present on different speech channels.

Figure 3:
FIG. 3 is a pulse chart of time position defining and control pulses utilized in the systems of FIGS. 1 and 2.

Transmission line 1 has been illustrated as being of the unbalanced type. It is either a coaxial cable or the single illustrated conductor is paired with a ground connected wire for shielding purposes to prevent inductive interference and thus crosstalk with other transmission lines or circuits provided in this system. In either event, transmission line 1 has distributed capacitance to ground as illustrated by capacitors 13 and 14, and energy is stored in said distributed capacitance by each of the multiplex pulses. In systems of the prior art, the guard time between multiplex pulses is made sufficiently long so that the energy stored in the distributed capacitance is discharged through the back resistance of the bilateral voice switches. If it is assumed that two thousand five hundred line circuits are associated with transmission line 1, that each of the two thousand five hundred voice switches has a back resistance of ten megohms, and that the distributed capacitance is equal to one thousand micromicrofarads, the time constant of the discharge circuit is four microseconds. Thus, in the systems of the prior art a guard time of four microseconds must be provided between multiplex pulses to prevent crosstalk between channels. In accordance with the present invention, a low impedance discharge path for the energy stored in the distributed capacitance of transmission line 1 is provided by bilateral transistor switch 15 which has its first emitter-collector electrode connected to transmission line 1 and its second emitter-collector electrode returned to ground. In the absence of control pulses, inverter amplifier transistor 16 is held non-conductive and the base electrode of transistor 15 is returned to plus six volt potential at the collector of transistor 16. Under these conditions, transistor 15 is held non-conductive and has an impedance of approximately ten megohms. The negative time position defining pulses appearing on conductors TP1–TP50 are combined in a fifty input "or" gate for negative signals comprising fifty diodes, such as diodes 17 and 18. Each negative pulse coupled through the gate is differentiated by capacitor 19 and resistor 20 and the resulting positive spike corresponding to the trailing edge of each time position defining pulse triggers transistor 16 conductive. When transistor 16 is conductive, minus six volt potential is applied to the base of bilateral switch transistor 15, transistor 15 becomes conductive, and the energy stored in capacitors 13 and 14 is discharged through transistor 15 to ground. Since transistor 15 has an impedance of approximately ten ohms when conductive, the time constant of the discharge circuit, still assuming that the distributed capacitance is equal to one thousand micromicrofarads, is .01 microsecond. The time relationship between the time division defining pulse and the control pulses at the collector of transistor 16 is graphically illustrated in FIG. 3 of the drawing. Power saving can be achieved by driving transistor 16 from the pulses appearing across the primary windings of the pulse transformers, such as transformer 5. Under these conditions, transistors 16 and 15 will be pulsed only at the termination of each multiplex channel actually in use on transmission line 1.

If is is assumed that each multiplex pulse is one microsecond long and that a guard time of one-half microsecond is provided between pulses, each pulse frame of fifty pulses is fifty-five microseconds in duration and pulse generator 4 thus has a frequency of 18 kc. On the other hand, if pulse generator 4 has a frequency of 8 kc., which is twice the frequency of the highest voice frequency encountered in telephone transmission and is recognized as adequate by those skilled in the art, each frame of pulses is one hundred and twenty-five microseconds in duration and eighty-three one microsecond channels with one-half microsecond guard time between channels may be transmitted over transmission line 1.

Figure 2:
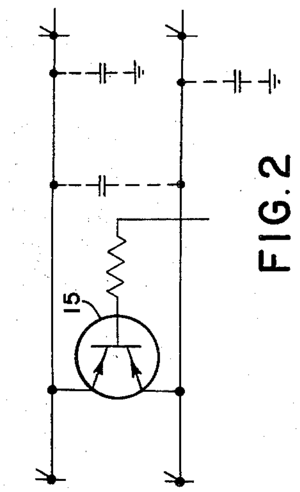
FIG. 2 shows a multiplex communication system of the balanced line type.

FIG. 2 shows the connection of discharge switch 15 to a balanced or two-conductor transmission line. For balanced operation, two voice switches, such as transistor 7, must be provided for connecting each line circuit to the transmission line, as is well known in the art. The two conductors of the balanced transmission line are usually a twisted pair and the distributed capacitance is between conductors and between the individual conductors and ground, as illustrated in FIG. 2. Switch 15 is operated at the termination of each multiplex pulse in the exact same manner as described for FIG. 1 and serves to complete a discharge path between the line conductors when it is conductive. The balanced line may comprise two coaxial cables and thus each conductor would have distributed capacitance to ground. Therefore, a switch, such as transistor 15, would be provided for each transmission line conductor for shorting that conductor to ground.

The invention has been illustrated as embodied in a two-way or two-wire system and it is to be understood that the invention can be used in four-wire systems in which a separate path is provided for each direction of transmission. Also, the PNP and NPN transistors used in the circuitry of FIGS. 1 and 2 can be replaced by NPN and PNP transistors, respectively, by the reversal of biasing potentials.

While there has been shown and described what is at present considered to be the preferred embodiment of the invention, other modifications thereto will readily occur to those skilled in the art. It is not desired, therefore, that the invention be limited to the embodiment shown and described, and it is intended to cover in the appended claims all such modifications as fall within the true spirit and scope of the invention.

What is claimed is:

1. A communication system comprising a transmission line having distributed capacitance, a plurality of signaling channels, means for developing a plurality of time interlaced pulse trains, means for individually assigning said pulse trains to said signaling channels, gating means interposed in a connection between each of said channels and said transmission line, means responsive to the receipt of each pulse of the pulse train assigned to a particular channel for operating the gating means between that channel and said transmission line to thereby connect that channel to said transmission line, a normally open switch operable when closed to discharge energy stored in said distributed capacitance, and means for utilizing only the trailing edge of each pulse of each pulse train to operate said switch to effect the closure thereof.

2. A communication system comprising a transmission line having distributed capacitance to ground, a plurality of signaling channels, means for developing a plurality of time interlaced pulse trains, means for individually assigning said pulse trains to said signaling channels, gating means interposed in a connection between each of said channels and said transmission line, means responsive to the receipt of each pulse of the pulse train assigned to a particular channel for operating the gating means between that channel and said transmission line to thereby connect that channel to said transmission line, a normally open switch operable when closed to connect said transmission line to ground to thereby discharge energy stored in said distributed capacitance, and means for utilizing only the trailing edge of each pulse of each pulse train to operate said switch to effect the closure thereof.

3. A communication system comprising a two-conductor transmission line having distributed capacitance between said conductors, a plurality of signaling channels, means for developing a plurality of time interlaced pulse trains, means for individually assigning said pulse trains to said signaling channels, gating means interposed in a connecton between each of said channels and said transmission lines, means responsive to the receipt of each pulse of the pulse train assigned to a particular channel for operating the gating means between that channel and said transmission line to connect that channel to said transmission line, a normally open switch connected between the two conductors of said transmission line and operable when closed to discharge energy stored in said distributed capacitance, and means for utilizing only the trailing edge of each pulse of each pulse train to operate said switch to effect the closure thereof.

4. A communication system comprising a transmission line having distributed capacitance to ground, a plurality of signaling channels, means for developing a plurality of time interlaced pulse trains, means for individually assigning said pulse trains to said signaling channels, gating means interposed in a connection between each of said channels and said transmission line, means controlled by each pulse of the pulse train assigned to a particular channel for operating the gating means between that channel and said transmission line to thereby connect that channel to said transmission line, a semi-conductor device having first and second emitter-collector electrodes and a base electrode, means for connecting said first electrode to said line, means for returning said second electrode to ground, means for differentiating each pulse of each pulse train to produce control pulses individually corresponding to the trailing edge of each pulse of each pulse train, means for applying said control pulses to said base electrode, and said device being biased for conduction only for the duration of each of said control pulses.

5. A communication system comprising a transmission line having first and second conductors, distributed capacitance between said conductors, a plurality of signaling channels, means for developing a plurality of time interlaced pulse trains, means for individually assigning said pulse trains to said signaling channels, gating means interposed in a connection between each of said channels and said transmission line, means responsive to the receipt of each pulse of the pulse train assigned to a particular channel for operating the gating means between that channel and said transmission line to thereby connect that channel to said transmission line, a semi-conductive device having first and second emitter-collector electrodes and a base electrode, means for connecting said first electrode to said first line conductor, means for connecting said second electrode to said second line conductor, means for differentiating each pulse of each pulse train to produce control pulses individually corresponding to the trailing edge of each pulse of each pulse train, means for applying said control pulses to said base electrode, and said device being biased for conduction only for the duration of each of said control pulses.

References Cited in the file of this patent

UNITED STATES PATENTS

| | | |
|---|---|---|
| 2,521,710 | Gallay | Sept. 12, 1950 |
| 2,767,330 | Marshall | Oct. 16, 1956 |
| 2,833,862 | Tolson | May 6, 1958 |
| 2,870,259 | Norris | Jan. 20, 1959 |
| 2,962,551 | Johannesen | Nov. 29, 1960 |

FOREIGN PATENTS

| | | |
|---|---|---|
| 725,396 | Great Britain | Mar. 2, 1955 |